United States Patent
Chien et al.

(10) Patent No.: US 10,234,752 B1
(45) Date of Patent: Mar. 19, 2019

(54) PROJECTOR AND LIGHT SOURCE MODULE

(71) Applicant: Coretronic Corporation, Hsin-Chu (TW)

(72) Inventors: Chao-Nan Chien, Hsin-Chu (TW); Yi-Cheng Hou, Hsin-Chu (TW); Chun-Ting Lin, Hsin-Chu (TW); Yi-Han Lai, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 15/942,451

(22) Filed: Mar. 31, 2018

(51) Int. Cl.
| | |
|---|---|
| G03B 21/16 | (2006.01) |
| G03B 21/20 | (2006.01) |
| F21V 29/76 | (2015.01) |
| F21Y 115/30 | (2016.01) |
| F21Y 115/10 | (2016.01) |

(52) U.S. Cl.
CPC ............ G03B 21/16 (2013.01); F21V 29/763 (2015.01); G03B 21/2013 (2013.01); G03B 21/2033 (2013.01); F21Y 2115/10 (2016.08); F21Y 2115/30 (2016.08)

(58) Field of Classification Search
CPC .... G03B 21/16; G03B 21/14; G03B 21/2013; G03B 21/2033; F21V 29/70; F21V 29/74; F21V 29/503; F21V 29/745; F21V 29/763
See application file for complete search history.

(56) References Cited

U.S. PATENT DOCUMENTS

| | | | | |
|---|---|---|---|---|
| 2008/0310167 | A1* | 12/2008 | Zaderej | H05K 3/301 |
| | | | | 362/294 |
| 2009/0095960 | A1* | 4/2009 | Murayama | H01L 25/0753 |
| | | | | 257/79 |
| 2010/0171935 | A1* | 7/2010 | Yamagishi | G03B 21/16 |
| | | | | 353/52 |
| 2013/0038841 | A1 | 2/2013 | Zakoji et al. | |
| 2014/0119024 | A1 | 5/2014 | Yu et al. | |
| 2016/0212841 | A1 | 7/2016 | Hartmann et al. | |
| 2017/0125971 | A1* | 5/2017 | Hiraga | H01S 5/022 |
| 2017/0211802 | A1* | 7/2017 | Dellock | F21V 29/74 |

FOREIGN PATENT DOCUMENTS

CN    101776248    6/2014

* cited by examiner

*Primary Examiner* — Sultan Chowdhury
(74) *Attorney, Agent, or Firm* — JCIPRNET

(57) ABSTRACT

A projector includes a light source module, a light valve, and a projection lens. The light source module includes a substrate, at least one light emitting element, a heat conducting structure, and at least one electricity insulating and heat conducting element. The light emitting element is disposed on the substrate, and has a conductive portion. The light emitting element provides an illumination beam. The heat conducting structure has at least one concave. The substrate is disposed in the at least one concave, and the conductive portion is located in the concave. The electricity insulating and heat conducting element is disposed in the concave, and covers the substrate and the conductive portion. The light valve is disposed on a transmission path of the illumination beam, and converts the illumination beam to an image beam. The projection lens is disposed on a transmission path of the image beam.

18 Claims, 6 Drawing Sheets

PROJECTOR AND LIGHT SOURCE MODULE

BACKGROUND OF THE INVENTION

Field of the Invention

The invention relates to an optical device and a component thereof, and more particularly, to a projector and a light source module.

Description of Related Art

Recently, projection apparatuses featuring solid-state light sources such as light-emitting diode (LED) and laser diode (LD) have gradually become dominant in the market. A laser diode has luminance efficiency approximately higher than 20%, and thus, pure color light sources constituted by LDs are gradually developed for projection apparatuses. In a LD projection apparatus, the LD light source excites the phosphor to emit light and acts as the direct light source which provides illumination to the projector. Besides, the light source(s) is(are) adjusted in response to different demands of various projectors for brightness. Accordingly, the projector with a LD light source system has great potential to replace the conventional high-pressure mercury lamp and become the next-generation mainstream projector. As the LED light source does, the LD light source generates heat while providing illumination to the projector. Hence, the heat dissipation ability of the light source module is still important for current projector designs.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a projector and a light source module that has excellent heat dissipation ability.

Other objects and advantages of the invention can be further understood from the technical features disclosed in the invention.

To achieve one or some or all of the objects above or other objects, an embodiment of the invention provides a projector including a light source module, a light valve, and a projection lens. The light source module includes a substrate, at least one light emitting element, a heat conducting structure, and at least one electricity insulating and heat conducting element. The light emitting element is disposed on the substrate, and has a conductive portion. The light emitting element is adapted to provide an illumination beam. The heat conducting structure has at least one concave. The substrate is disposed in the at least one concave, and the conductive portion is located in the concave. The electricity insulating and heat conducting element is disposed in the concave, and covers the substrate and the conductive portion. The light valve is disposed on a transmission path of the illumination beam, and is adapted to convert the illumination beam to an image beam. The projection lens is disposed on a transmission path of the image beam.

To achieve one or some or all of the objects above or other objects, an embodiment of the invention provides a light source module including a substrate, at least one light emitting element, a heat conducting structure, and at least one electricity insulating and heat conducting element. The light emitting element is disposed on the substrate, and has a conductive portion. The heat conducting structure has at least one concave. The substrate is disposed in the at least one concave, and the conductive portion is located in the concave. The electricity insulating and heat conducting element is disposed in the concave, and covers the substrate and the conductive portion.

Based on the above, the embodiments of the invention have at least one of the following advantages or efficacies. The electricity insulating and heat conducting element is disposed in the concave of the heat conducting structure to contact the conductive portion located in the concave. Accordingly, the heat generated by the light emitting element is conducted to the heat dissipation structure not only through the heat conducting structure, but also through the conductive portion of the light emitting element and the electricity insulating and heat conducting element. By doing this, the heat conduction paths are increased, so as to enhance the heat dissipation efficiency of the light source module.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
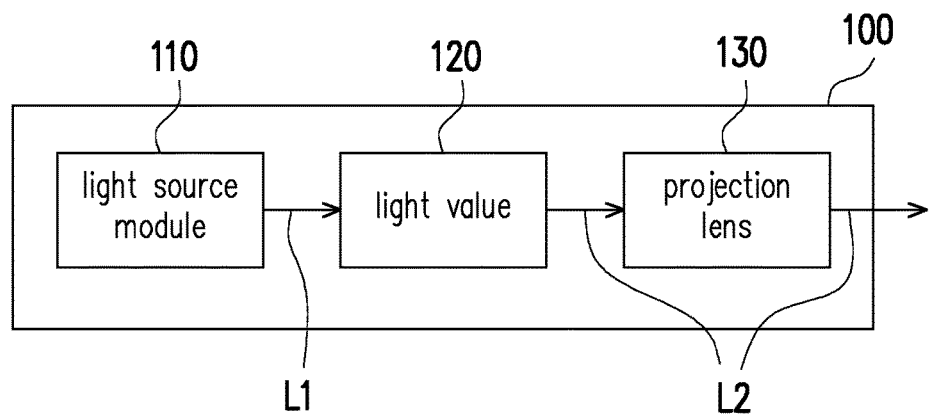
FIG. 1 is a schematic view of a projector of an embodiment of the invention.

FIG. 1 is a schematic view of a projector of an embodiment of the invention. Referring to FIG. 1, a projector 100 of the embodiment includes a light source module 110, a light valve 120, and a projection lens 130. At least one light emitting element (described as follows) of the light source module 110 is adapted to provide an illumination beam L1. The light valve 122 may be, for example, a digital micromirror device (DMD), Liquid Crystal Display (LCD) or (Liquid Crystal on Silicon, LCoS) disposed on the transmission path of the illumination beam L1 and adapted to convert the illumination beam L1 to an image beam L2. The projection lens 124 is disposed on the transmission path of the image beam L2 and is adapted to transmit the image beam L2 to an outside of the projector 100.

Figure 2:
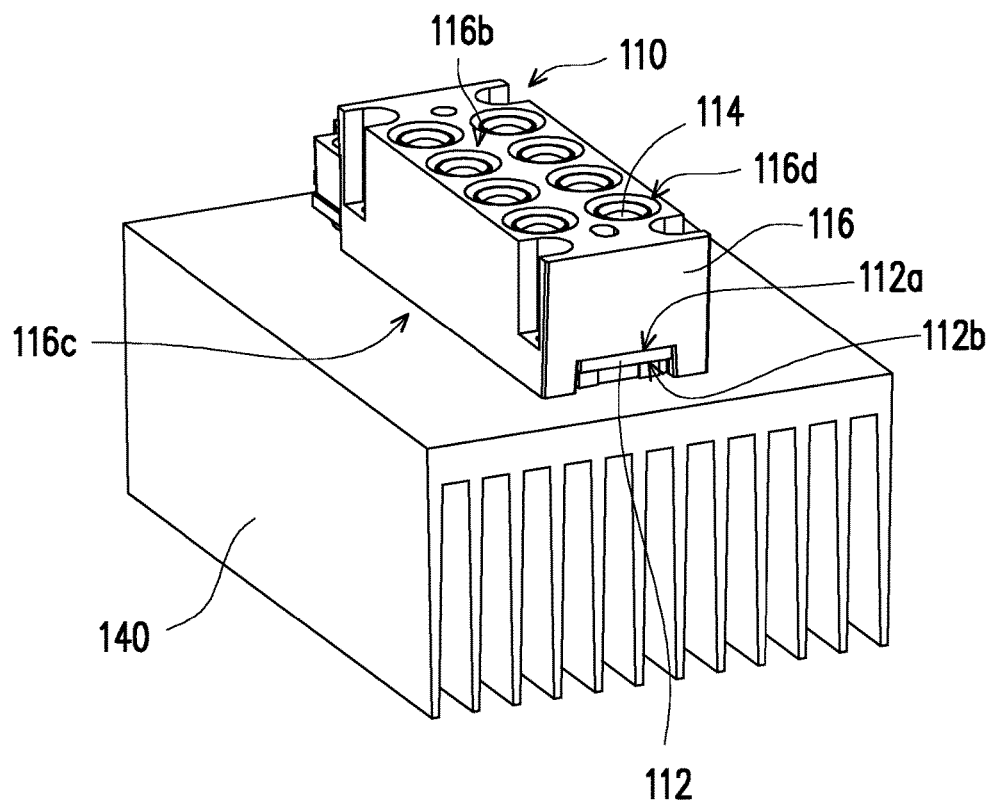
FIG. 2 is a three-dimensional view of partial components of the projector of FIG. 1.
Figure 3:
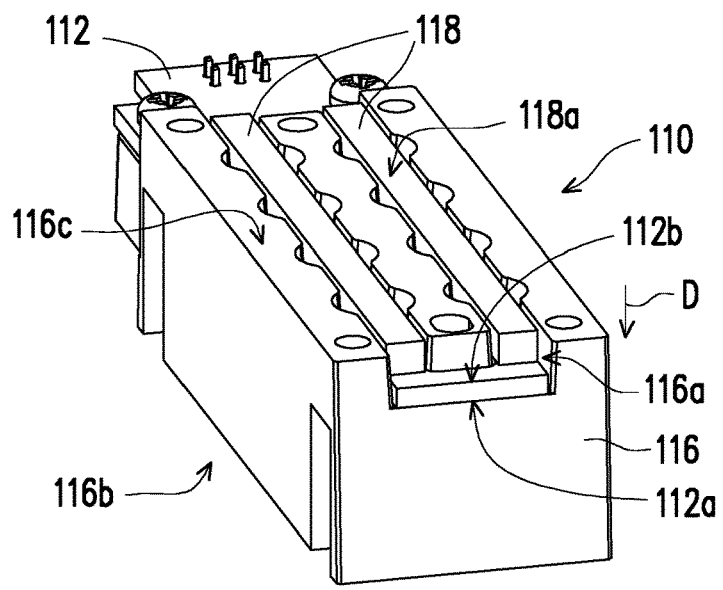
FIG. 3 is a three-dimensional view of the light source module of FIG. 2.
Figure 4:
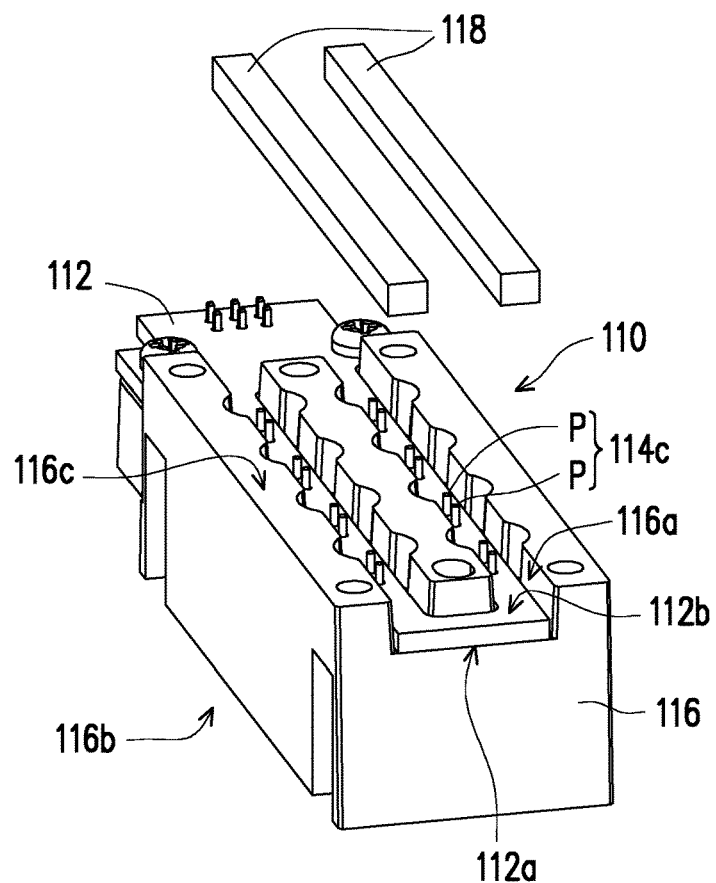
FIG. 4 is an exploded view of the light source module of FIG. 3.
Figure 5:
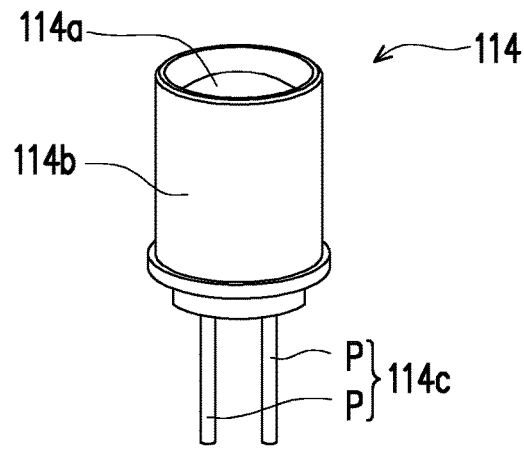
FIG. 5 is a three-dimensional view of the light emitting element of FIG. 2.

FIG. 2 is a three-dimensional view of partial components of the projector of FIG. 1. FIG. 3 is a three-dimensional view of the light source module of FIG. 2. FIG. 4 is an exploded view of the light source module of FIG. 3. FIG. 5 is a three-dimensional view of the light emitting element of FIG. 2. Referring to FIG. 2 to FIG. 5, the light source module 110 includes a substrate 112, at least one light emitting element (a plurality of light emitting elements 114 is illustrated for example), a heat conducting structure 116, and at least one electricity insulating and heat conducting element 118 (two are illustrated for example). The substrate 112 is, for example, a circuit board. The light emitting elements 114 are disposed on the substrate 112, and each of the light emitting elements 114 includes a light emitting unit 114a, a housing 114b, and a conductive portion 114c. The light emitting unit 114a is, for example, a laser diode. Each of the conductive portions 114c, for example, includes two conductive pins P and is connected to the light emitting unit 114a disposed in the housing 114b. In other embodiments, the light emitting unit may be a light emitting diode (LED), and the invention is not limited thereto.

The projector 100 (labeled in FIG. 1) further includes a heat dissipation structure 140, as shown in FIG. 2. The heat dissipation structure 140 is, for example, a heat dissipation fin set or a heat sink the invention is not limited thereto. The heat conducting structure 116 is disposed on the heat dissipation structure 140. The heat conducting structure 116 and the electricity insulating and heat conducting elements 118 are in contact with the heat dissipation structure 140.

As illustrated in FIG. 3 and FIG. 4, the heat conducting structure 116 has at least one concave 116a (one is illustrated for example), the substrate 112 is disposed in the concave 116a, and the conductive portions 114c of the light emitting elements 114 are located in the concave 116a, so as to prevent the conductive portions 114c from contacting the heat dissipation structure 140, which leads to a short circuit. The electricity insulating and heat conducting elements 118 having both an electrical insulation property and a heat conduction property are disposed in the concave 116a and in contact with the substrate 112, and cover the substrate 112 and the conductive portions 114c. Accordingly, the heat generated by the light emitting elements 114 is conducted to the heat dissipation structure 140 not only through the heat conducting structure 116, but also through the conductive portions 114c of the light emitting elements 114 and the electricity insulating and heat conducting elements 118. By doing this, the heat conduction paths are increased, so as to enhance the heat dissipation efficiency of the light source module 110.

By the electrical insulation property of the electricity insulating and heat conducting elements 118, the conductive portions 114c are prevented from being electrically connected to the heat dissipation structure 140, which leads to a short circuit. In addition, by the heat conduction property of the electricity insulating and heat conducting elements 118, the heat from the conductive portions 114c is conducted to the heat dissipation structure 140 efficiently.

Figure 6:
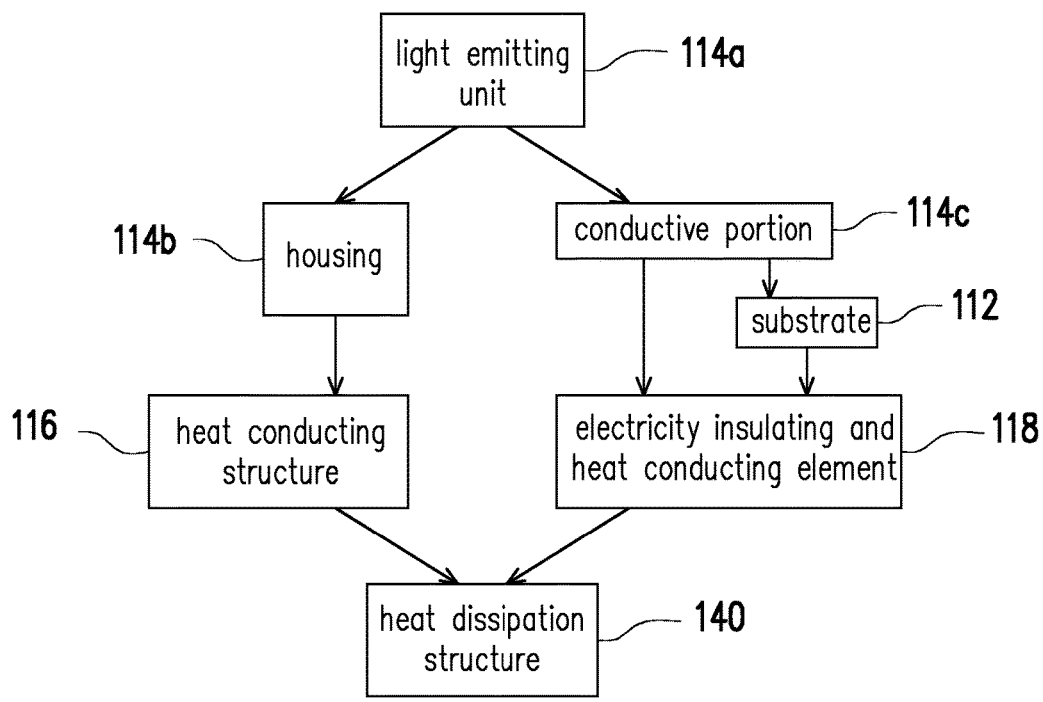
FIG. 6 is a schematic view of the heat conduction paths of the light source module and the heat dissipation structure of FIG. 2.

FIG. 6 is a schematic view of the heat conduction paths of the light source module and the heat dissipation structure of FIG. 2. Referring to FIG. 6, specifically, the heat generated by the light emitting unit 114a is conducted to the heat dissipation structure 140 not only through the housing 114b and the heat conducting structure 116, but also through the conductive portion 114c, the substrate 112, and the electricity insulating and heat conducting elements 118.

The structural details of the light source module 110 are described as follows. In the embodiment, the substrate 112 has a front surface 112a and a rear surface 112b opposite to each other, the light emitting elements 114 are disposed on the front surface 112a, and the conductive structure 114c is extended to the rear surface 112b. In addition, the heat conducting structure 116 has a front side 116b, a rear side 116c, and at least one first opening (a plurality of first openings 116d is illustrated for example). The front side 116b and the rear side 116c are opposite to each other, the first openings 116d are formed at the front side 116b of the heat conducting structure 116, the light emitting elements 114 are exposed by the first openings 116d respectively, and the concave 116a is formed at the rear side 116c of the heat conducting structure 116.

In the embodiment, the sum of the thicknesses of the electricity insulating and heat conducting element 118 and the substrate 112 along the depth direction D (labeled in FIG. 3) of the concave 116a is equal to the depth of the concave 116a along the depth direction D. Thus, as illustrated in FIG. 3, an outer surface 118a of each of the electricity insulating and heat conducting elements 118 is coplanar with an outer surface (the rear side 116c) of the heat conducting structure 116, and the electricity insulating and heat conducting elements 118 and the heat conducting structure 116 may both contact the heat dissipation structure 140.

Each of the electricity insulating and heat conducting elements 118 of the embodiment is, for example, a thermal pad, and the heat transfer coefficient thereof is, for example, lower than that of the air. Specifically, the heat transfer coefficient of the electricity insulating and heat conducting element 118 may be 0.026~50 W/mk, and the invention is not limited thereto.

Figure 7:
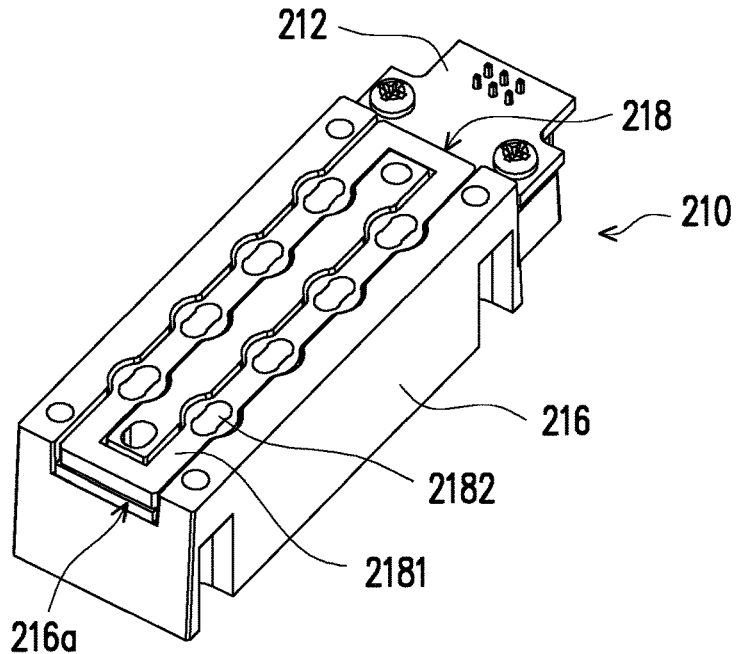
FIG. 7 is a three-dimensional view of a light source module of another embodiment of the invention.
Figure 8:
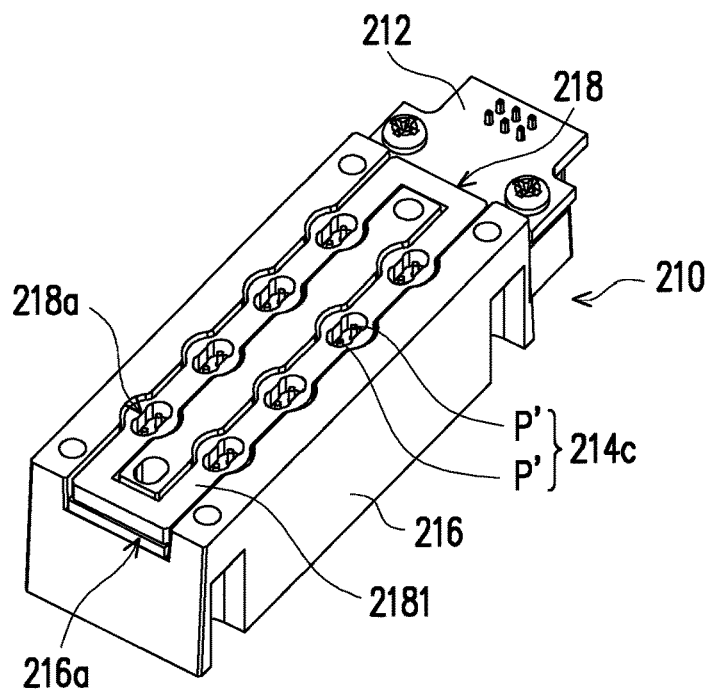
FIG. 8 is a three-dimensional view of partial components of the light source module of FIG. 7.

FIG. 7 is a three-dimensional view of a light source module of another embodiment of the invention. FIG. 8 is a three-dimensional view of partial components of the light source module of FIG. 7. In the light source module 210 of FIG. 7 and FIG. 8, the arrangement of the substrate 212, the conductive portions 214c, the heat conducting structure 216, and the electricity insulating and heat conducting element 218 is similar to the arrangement of the substrate 112, the conductive portions 114c, the heat conducting structure 116, and the electricity insulating and heat conducting element 118 in FIG. 3 and FIG. 4, and is not repeated here. The main difference between the light source module 210 and the light source module 110 is that, the electricity insulating and heat conducting element 218 includes at least one metal sheet (a metal sheet 2181 is illustrated for example) and at least one glue (a plurality of glues 2182 is illustrated for example). The metal sheet 2181 is disposed in the concave 216a of the heat conducting structure 216 and in contact with the substrate 212, the metal sheet 2181 has at least one second opening (a plurality of second openings 218a is illustrated for example) aligned to the conductive portions 214c respectively, and the glues 2182 are disposed in the second openings 218a respectively for covering the conductive portions 214c.

The glues 2182 are, for example, heat conducting glue having both an electrical insulation property and a heat conduction property. By the electrical insulation property of the glues 2182, the conductive portions 214c are prevented from being electrically connected to the heat dissipation structure (such as the heat dissipation structure 140 in FIG. 2), which leads to a short circuit. In addition, by the heat conduction property of the glues 2182, the heat from the conductive portions 214c is conducted to the heat dissipation structure (such as the heat dissipation structure 140 in FIG. 2) efficiently. Further, by the heat conduction property of the metal sheet 2181, the heat from the substrate 212 is conducted to the heat dissipation structure (such as the heat dissipation structure 140 in FIG. 2) efficiently.

Figure 9:
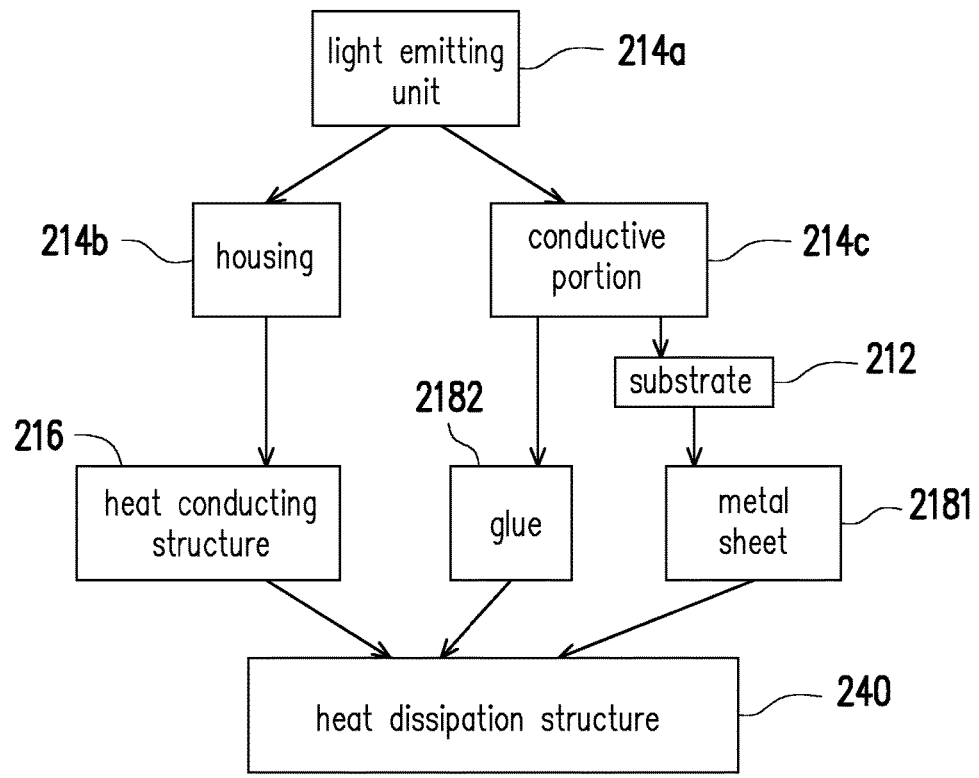
FIG. 9 is a schematic view of the heat conduction paths of the light source module and the heat dissipation structure of FIG. 7.

FIG. 9 is a schematic view of the heat conduction paths of the light source module and the heat dissipation structure of FIG. 7. Referring to FIG. 9, specifically, the heat generated by the light emitting unit 214a is conducted to the heat dissipation structure 240 not only through the housing 214b and the heat conducting structure 216, but also through the conductive portion 214c, the substrate 212, the metal sheet 2181, and the glues 2182. The arrangement of the light emitting unit 214a, the housing 214b, and the heat dissipation structure 240 is similar to the arrangement of the light emitting unit 114a, the housing 114b, and the heat dissipation structure 140 in FIG. 2 and FIG. 5, and is not repeated here.

Figure 10:
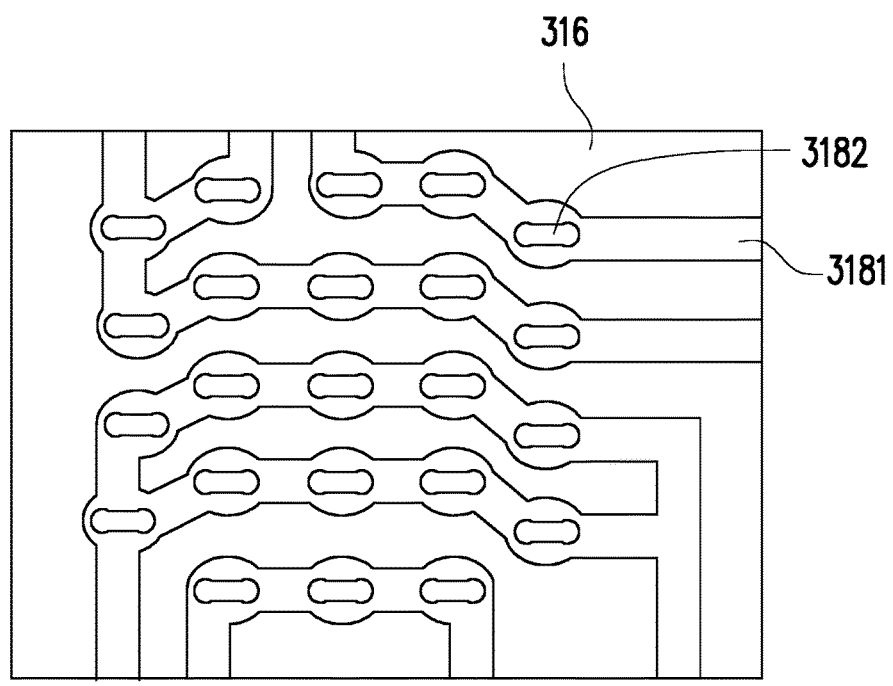
FIG. 10 is a schematic view of partial components of a light source module of another embodiment.

FIG. 10 is a schematic view of partial components of a light source module of another embodiment. The arrangement of the heat conducting structure 316, the metal sheet 3181, and the glues 3182 in FIG. 10 is similar to the arrangement of the heat conducting structure 216, the metal sheet 2181, and the glues 2182 in FIG. 7, and is not repeated here. The main difference between the embodiments in FIG. 10 and FIG. 7 is that, the amount of the metal sheets 3181 is plural and the metal sheets 3181 are arranged irregularly.

Based on the above, the embodiments of the invention have at least one of the following advantages or efficacies. The electricity insulating and heat conducting element is disposed in the concave of the heat conducting structure to contact the conductive portion located in the concave. Accordingly, the heat generated by the light emitting element is conducted to the heat dissipation structure not only through the heat conducting structure, but also through the conductive portion of the light emitting element and the electricity insulating and heat conducting element. By doing this, the heat conduction paths are increased, so as to enhance the heat dissipation efficiency of the light source module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. A projector, comprising:
　a light source module, comprising:
　　a substrate;
　　at least one light emitting element, disposed on the substrate, and having a conductive portion, wherein the at least one light emitting element is adapted to provide an illumination beam;

a heat conducting structure, having at least one concave, wherein the substrate is disposed in the at least one concave, and the conductive portion is located in the concave; and at least one electricity insulating and heat conducting element, disposed in the concave, and covering the substrate and the conductive portion;

a light valve, disposed on a transmission path of the illumination beam, and adapted to convert the illumination beam to an image beam; and a projection lens, disposed on a transmission path of the image beam;

wherein an outer surface of the at least one electricity insulating and heat conducting element is coplanar with an outer surface of the heat conducting structure.

2. The projector as claimed in claim 1, further comprising a heat dissipation structure, wherein the heat conducting structure is disposed on the heat dissipation structure, and the heat conducting structure and the at least one electricity insulating and heat conducting element are in contact with the heat dissipation structure.

3. The projector as claimed in claim 1, wherein the substrate has a front surface and a rear surface opposite to each other, the at least one light emitting element is disposed on the front surface, and the conductive portion is extended to the rear surface.

4. The projector as claimed in claim 1, wherein the heat conducting structure has a front side, a rear side, and at least one first opening, the front side and the rear side are opposite to each other, the at least one first opening is formed at the front side, the at least one light emitting element is exposed by the at least one first opening, and the at least one concave is formed at the rear side.

5. The projector as claimed in claim 1, wherein a sum of the thicknesses of the at least one electricity insulating and heat conducting element and the substrate is equal to a depth of the concave.

6. The projector as claimed in claim 1, wherein the at least one electricity insulating and heat conducting element comprises at least one thermal pad.

7. The projector as claimed in claim 1, wherein the at least one electricity insulating and heat conducting element comprises at least one metal sheet and at least one glue, the at least one metal sheet is disposed in the concave and in contact with the substrate, the at least one metal sheet has at least one second opening aligned to the conductive portion, and the glue is disposed in the second opening.

8. The projector as claimed in claim 1, wherein the conductive portion comprises two conductive pins.

9. The projector as claimed in claim 1, wherein the at least one light emitting element comprises at least one laser diode or at least one light emitting diode.

10. A light source module, comprising:
a substrate;
at least one light emitting element, disposed on the substrate, and having a conductive portion;
a heat conducting structure, having at least one concave, wherein the substrate is disposed in the at least one concave, and the conductive portion is located in the concave; and
at least one electricity insulating and heat conducting element, disposed in the concave, and covering the substrate and the conductive portion,
wherein an outer surface of the at least one electricity insulating and heat conducting element is coplanar with an outer surface of the heat conducting structure.

11. The light source module as claimed in claim 10, wherein the heat conducting structure is adapted to be disposed on a heat dissipation structure, and the heat conducting structure and the at least one electricity insulating and heat conducting element are adapted to be in contact with the heat dissipation structure.

12. The light source module as claimed in claim 10, wherein the substrate has a front surface and a rear surface opposite to each other, the at least one light emitting element is disposed on the front surface, and the conductive portion is extended to the rear surface.

13. The light source module as claimed in claim 10, wherein a sum of the thicknesses of the at least one electricity insulating and heat conducting element and the substrate is equal to a depth of the concave.

14. The light source module as claimed in claim 10, wherein the conductive portion comprises two conductive pins.

15. The light source module as claimed in claim 10, wherein the at least one light emitting element comprises at least one laser diode or at least one light emitting diode.

16. A light source module, comprising:
a substrate;
at least one light emitting element, disposed on the substrate, and having a conductive portion;
a heat conducting structure, having at least one concave, wherein the substrate is disposed in the at least one concave, and the conductive portion is located in the concave; and
at least one electricity insulating and heat conducting element, disposed in the concave, and covering the substrate and the conductive portion,
wherein the heat conducting structure has a front side, a rear side, and at least one first opening, the front side and the rear side are opposite to each other, the at least one first opening is formed at the front side, the at least one light emitting element is exposed by the at least one first opening, and the at least one concave is formed at the rear side.

17. A light source module, comprising:
a substrate;
at least one light emitting element, disposed on the substrate, and having a conductive portion;
a heat conducting structure, having at least one concave, wherein the substrate is disposed in the at least one concave, and the conductive portion is located in the concave; and
at least one electricity insulating and heat conducting element, disposed in the concave, and covering the substrate and the conductive portion,
wherein the at least one electricity insulating and heat conducting element comprises at least one thermal pad.

18. A light source module, comprising:
a substrate;
at least one light emitting element, disposed on the substrate, and having a conductive portion;
a heat conducting structure, having at least one concave, wherein the substrate is disposed in the at least one concave, and the conductive portion is located in the concave; and
at least one electricity insulating and heat conducting element, disposed in the concave, and covering the substrate and the conductive portion, wherein the at least one electricity insulating and heat conducting element comprises at least one metal sheet and at least one glue, the at least one metal sheet is disposed in the concave and in contact with the substrate, the at least one metal sheet has at least one second opening aligned to the conductive portion, and the glue is disposed in the second opening.

* * * * *